UNITED STATES PATENT OFFICE.

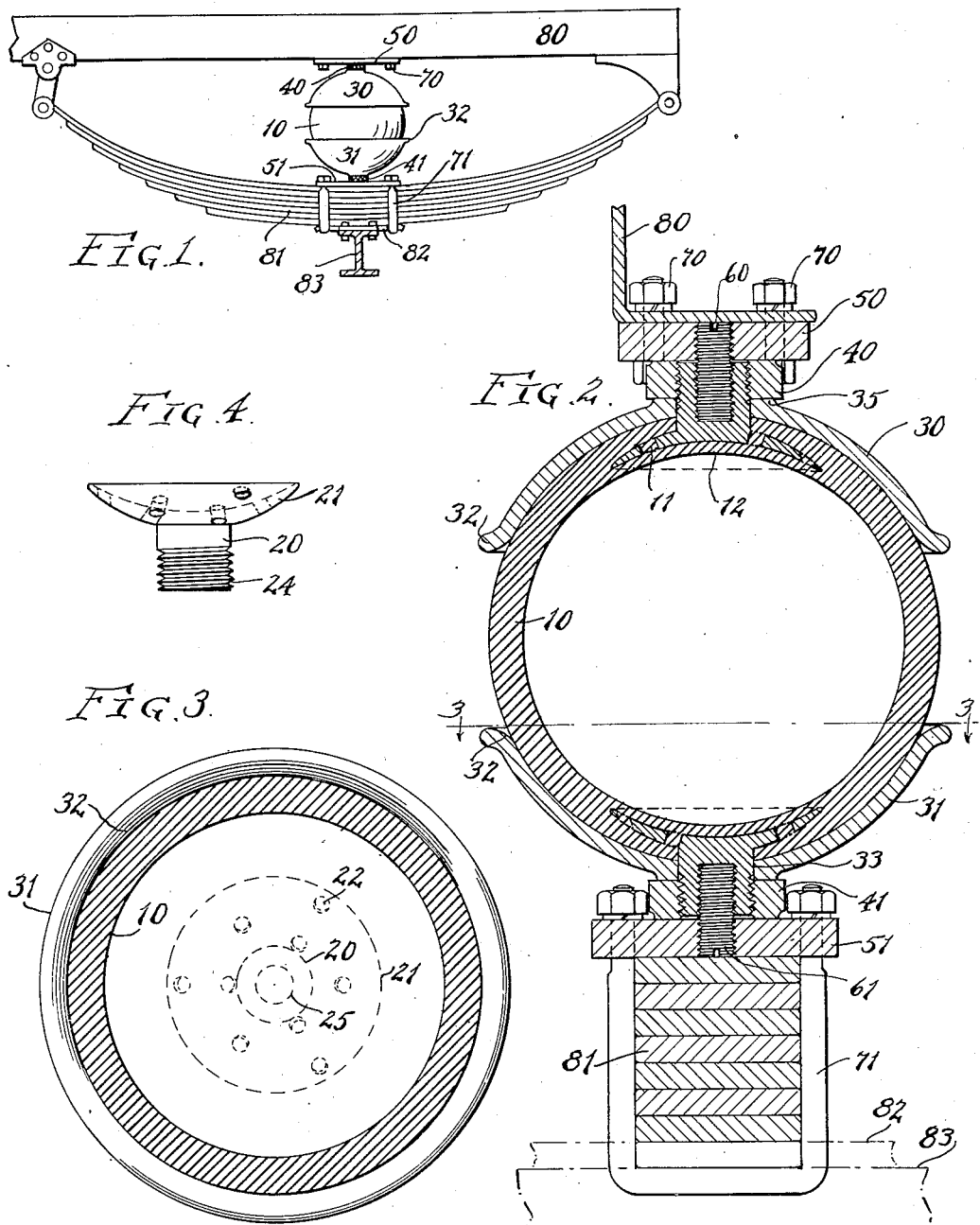

FRED THOMAS ROBERTS, OF TRENTON, NEW JERSEY, ASSIGNOR TO THE PARAMOUNT RUBBER COMPANY, OF CLEVELAND, OHIO, A CORPORATION OF OHIO.

SHOCK-ABSORBER.

1,159,799.  Specification of Letters Patent.  Patented Nov. 9, 1915.

Application filed March 8, 1915. Serial No. 12,748.

*To all whom it may concern:*

Be it known that I, FRED THOMAS ROBERTS, a citizen of the United States, residing at Trenton, in the county of Mercer and State of New Jersey, have invented a certain new and useful Improvement in Shock-Absorbers, of which the following is a full, clear, and exact description, reference being had to the accompanying drawings.

The object of this invention is to provide an efficient device for cushioning and absorbing the shocks incident to the operation of wheeled vehicles. My shock absorber is especially well adapted for heavy vehicles, as for example, automobile trucks, though its use is not restricted thereto.

My shock absorber comprises a hollow ball seated in a pair of separated cups and effectively anchored at its axis, above and below, to members of the vehicle structure. Thus the absorber may be used between an axle and chassis frame, or between the two portions of elliptical springs or between a half elliptical spring, and a chassis frame, or indeed it may take the place of the spring.

My invention is hereinafter more fully explained in connection with a preferred embodiment of it shown in the drawings, and the essential characteristics are set out in the claims.

In the drawings, Figure 1 is a side elevation of my shock absorber and a portion of a chassis frame and semi-elliptical spring between which the absorber is mounted; Fig. 2 is an enlarged transverse vertical section of the absorber and its mounting; Fig. 3 is a horizontal section on the line 3—3 of Fig. 2; and Fig. 4 is a side elevation of one of the anchors.

As shown in the drawings, 10 represents a hollow ball or sphere of rubber. The wall of this sphere is preferably of considerable thickness, and within the sphere is preferably air under considerable pressure. Such compressed air may be entrapped within the ball at the time it is manufactured, as, for example, by the process described in my application No. 793,025, filed October 2, 1913.

The ball or sphere is provided with two diametrically opposite anchors having axially projecting studs 20 and saucer-shaped heads 21, (preferably somewhat crescent-shaped in cross section), which are embedded in the rubber of the ball. The stud and head may conveniently be an integral metal casting. The head is provided with holes 22 through it, arranged at different distances from the axis, and through these holes the rubber extends, as shown at 11, thus connecting the portion of the rubber wall above and below the head. The holes 22 may conveniently be arranged in several annular rows about the axis. Fig. 3 discloses three of these rows, each row having three holes. The head is preferably roughened or pitted to allow the rubber to be vulcanized to it. It is to be understood that in the manufacture of the ball before vulcanizing the rubber is formed around the head and shank of the stud, as shown in Fig. 2, and thereafter the rubber is vulcanized. I find it desirable to thicken the rubber at 12, along the inner surface of the head.

Each stud is preferably provided with external threads 24 and internal threads in the wall of a bore 25, which extends from the outer end of the stud part way to the inner end. These threads provide a convenient means for securing the absorber, as hereinafter explained.

The ball described, seats above and below in a pair of cups 30 and 31. Each cup has substantially a spherical interior and extends somewhat less than a semi-circumference. Near the free edges the cup curves or flares outwardly as shown at 32. Each cup is provided with a central opening 33, substantially the diameter of the stud 20, and around this central opening has, on its outer face, a flattened boss 35.

40 and 41 indicate a pair of nuts which screw onto the external threads 24 of the two anchoring heads, and thus firmly clamp the cups 30 and 31 to the ball at the axis thereof. These nuts may conveniently be round with knurled exteriors as shown.

The structure described, comprising an inflated hollow ball, anchoring heads, cups and nuts, provides a complete shock absorber, ready for attachment to any suitable structure, simply by means of a suitable screw passing into the threaded bores 25. I have shown a pair of rectangular plates 50 and 51, to which the anchoring heads are secured by screws 60 and 61. The upper plate 50 is shown as secured by bolts 70 to the horizontal flange of the chassis frame 80. The plate 51 is shown as provided with a pair of shackles 71, which extend around and clamp the leaves 81 of the spring, as well as the plate 82, secured to the axle 83. This is a convenient and satisfactory form of anchorage above and below, but it is to be understood that it may be varied as desired.

When my shock absorber is in place, it cushions the movement of the parts to which it is anchored, both toward and from each other. That is to say, on the downward movement of the vehicle frame in the embodiment shown, the ball is flattened somewhat and the side walls protrude to some extent, laterally, into the open space provided between the cups; on the upward movement of the vehicle frame the ball is vertically elongated, and the sides correspondingly contract some way from the free edges of the cups. By anchoring the ball at its axis, as shown, freedom is provided for both these movements. It should be noted also that the anchor of the ball is permanent and independent of the inflation. Preferably the ball contains air under considerable pressure, but leakage of such air would not interfere in any way with the effective anchoring of the ball. My shock absorbing device is easily installed; there is nothing about it to get out of order; it is durable, and very effective in service.

In the manufacture of my device I have found it very convenient to form the ball with its embedded anchors by first placing the anchor in a recess in a female hemispherical mold with a portion of the shank and the head extending into the cavity; then to place a block of rubber in such cavity over the concaved side of the head and extending onto the female mold, and then to force a corresponding male mold against the rubber, compressing the same and forcing it edgewise, and causing a portion of it to travel onto the opposite side of the head. In this manner a semi-cured hemisphere of rubber is formed with the embedded anchor. Two of these hemispheres may then be brought together in an atmosphere of air under pressure, as described in my application referred to, and then, while held together with the air entrapped, are vulcanized to firmly secure the two halves together and firmly lock the anchor to the rubber. To make a secure weld where the two hemispheres meet, it is desirable to oppositely bevel the edges of such hemispheres, providing a lap seam, as shown and claimed in my application No. 879,556, filed December 29, 1914.

Having thus described my invention, what I claim is:

1. In a shock absorber, the combination of a hollow rubber permanently inflated ball, and a pair of anchors secured to the ball at diametrically opposite points, each anchor comprising a projecting stud and a head embedded in the rubber ball.

2. In a shock absorber, the combination of a hollow rubber ball, a pair of anchors secured thereto, each anchor comprising a screw threaded stud with the head embedded in the rubber of the ball, and nuts engaging the threads of the respective studs.

3. In a shock absorber, the combination of an elastic body, a pair of anchors secured thereto and projecting from opposite sides thereof, a pair of separated cups in which the body seats, said cups having central openings through which the anchors project.

4. The combination of a ball, a pair of studs secured thereto and projecting from diametrically opposite points thereof, a pair of cups in which the ball may seat, said cups having central openings through which the studs project, and nuts screwing onto the studs beyond the cups.

5. In a shock absorber, the combination of a rubber body, a pair of studs having heads embedded in the body, the studs projecting beyond the outer surface of the body, a pair of cups, and means engaging the studs to anchor the body in the cups.

6. In a shock absorber, the combination of a hollow rubber ball, a pair of studs having saucer-shaped heads embedded in the rubber of the ball, the studs projecting beyond the outer surface of the ball, and means engaging the studs to anchor the ball in place.

7. The combination of a hollow inflated rubber body, a pair of opposite studs projecting therefrom and having heads embedded in the wall of the body and vulcanized thereto, a pair of cups in which the body seats, said cups having central openings through which the studs project, and nuts screwing onto the studs beyond the cups.

8. In a shock absorber, the combination of a hollow elastic ball, an externally threaded stud having a saucer-shaped head embedded in the wall of the ball, a cup through which the stud extends, and a nut screwing onto the stud beyond the cup.

9. In a socket absorber, the combination of a hollow rubber body, a pair of anchoring devices therefor, each comprising a stud and a saucer-shaped head with holes through it, said head being embedded in the rubber of the body and vulcanized thereto and the stud projecting beyond the body.

10. In a shock absorber, the combination of an elastic body, studs projecting therefrom and having heads embedded therein, each stud having an external and an internal thread, a seat for the body around the stud, a nut screwing onto the external thread and clamping the body to its seat, and a screw occupying the internal thread.

11. In a shock absorber, the combination of a hollow rubber ball, a pair of studs secured thereto and projecting in opposite directions therefrom, each stud having an external and an internal thread, seats for the ball around the studs, nuts screwing onto the external threads and clamping the ball to its seats, and screws occupying the internal thread and adapted to hold the absorber in place.

12. The combination of a hollow inflated rubber ball, a pair of anchors therefor, each comprising a stud with a saucer-shaped head embedded in the rubber and vulcanized thereto, a pair of seats for the ball each comprising a cup having a spherical interior extending for less than a hemisphere, nuts screwing onto the respective external threads and clamping the cups to the ball, and a pair of securing plates clamped to the studs and cups by screws occupying the internal thread.

In testimony whereof, I hereunto affix my signature in the presence of two witnesses.

FRED THOMAS ROBERTS.

Witnesses:
JOHN R. D. BOWER,
W. L. WATSON.